US012170642B2

(12) United States Patent
Ballard et al.

(10) Patent No.: US 12,170,642 B2
(45) Date of Patent: Dec. 17, 2024

(54) MANAGING FAILOVER BETWEEN INFORMATION HANDLING SYSTEMS

(71) Applicant: Dell Products L.P., Round Rock, TX (US)

(72) Inventors: Lee Eric Ballard, Georgetown, TX (US); Jonathan Foster Lewis, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 649 days.

(21) Appl. No.: 17/447,590

(22) Filed: Sep. 14, 2021

(65) Prior Publication Data

US 2023/0077521 A1   Mar. 16, 2023

(51) Int. Cl.
*H04L 61/103* (2022.01)
*H04L 47/20* (2022.01)
(Continued)

(52) U.S. Cl.
CPC ............ *H04L 61/103* (2013.01); *H04L 47/20* (2013.01); *H04L 47/22* (2013.01); *G06F 13/36* (2013.01);
(Continued)

(58) Field of Classification Search
CPC ....... H04L 61/103; H04L 47/20; H04L 47/22; H04L 2101/622; G06F 13/36; G06F 2213/3808
See application file for complete search history.

(56) References Cited

U.S. PATENT DOCUMENTS 6,560,630 B1 * 5/2003 Vepa ...................... H04L 47/10
  709/250
7,840,706 B1 * 11/2010 Abdulla ................. H04L 49/90
  710/9

(Continued)

FOREIGN PATENT DOCUMENTS

CN    101488918 A    * 7/2009
CN    113285874 A    * 8/2021    ............. H04L 45/54
(Continued)

OTHER PUBLICATIONS

Screen captures from YouTube video clip entitled "Netdev 2.2: TC Workshop," 3 pages, uploaded on Mar. 15, 2018 by user "netdevconf". Retrieved from Internet: <https://www.youtube.com/watch?v=1ZskZfljEUs&t=2956s>.

(Continued)

*Primary Examiner* — Saad A. Waqas
(74) *Attorney, Agent, or Firm* — McDermott Will & Emery LLP

(57) ABSTRACT

Managing failover between information handling systems, including receiving, at an interface of a smart network interface card (smartNIC) of a primary information handling system, a packet, the primary information handling system communicatively couped to a secondary information handling system; determining whether the packet was transmitted by a network interface card (NIC) of the secondary information handling system; determining that the packet was transmitted by the NIC of the secondary information handling system, and in response, determining whether the packet is an address resolution protocol (ARP) request; determining that the packet is an ARP request, and in response, cloning a medium access control (MAC) address of the NIC of the secondary information handling system at (Continued)

the smartNIC of the primary information handling system; and forwarding the ARP request to a uplink connection.

17 Claims, 3 Drawing Sheets

(51) Int. Cl.
  *H04L 47/22* (2022.01)
  *G06F 13/36* (2006.01)
  *H04L 101/622* (2022.01)
(52) U.S. Cl.
  CPC ............... *G06F 2213/3808* (2013.01); *H04L 2101/622* (2022.05)

(56) References Cited

U.S. PATENT DOCUMENTS 10,516,645 B1 * 12/2019 Patel .................... H04L 61/103
2006/0143309 A1 * 6/2006 McGee ............... H04L 67/1001
  709/250
2014/0052309 A1 * 2/2014 Chandrasekhar ....... G06F 1/266
  700/297

FOREIGN PATENT DOCUMENTS

| | | | | |
|---|---|---|---|---|
| JP | 2005506726 A | * | 3/2005 | |
| JP | 2005286875 A | * | 10/2005 | |
| WO | WO-2006090373 A1 | * | 8/2006 | ............. H04L 12/24 |
| WO | WO-2012000234 A1 | * | 1/2012 | ............. H04L 41/04 |
| WO | WO-2022088743 A1 | * | 5/2022 | ......... G06F 9/45558 |

OTHER PUBLICATIONS

Chan, Michael. "Bnxt_en TC Flower offload," Broadcom, 2017.
Networking Bypass Adapters—Silicom Ltd. Connectivity Solutions, Retrieved from url: https://www.silicom-usa.com/cats/server-adapters/networking-bypass-adapters/, Feb. 9, 2022.

* cited by examiner

MANAGING FAILOVER BETWEEN INFORMATION HANDLING SYSTEMS

BACKGROUND

Field of the Disclosure

The disclosure relates generally to an information handling system, and in particular, managing failover between information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of managing failover between information handling systems, the method including receiving, at an interface of a smart network interface card (smartNIC) of a primary information handling system, a packet, the primary information handling system communicatively couped to a secondary information handling system; determining whether the packet was transmitted by a network interface card (NIC) of the secondary information handling system; determining that the packet was transmitted by the NIC of the secondary information handling system, and in response, determining whether the packet is an address resolution protocol (ARP) request; determining that the packet is an ARP request, and in response, cloning a medium access control (MAC) address of the NIC of the secondary information handling system at the smartNIC of the primary information handling system; and forwarding the ARP request to a uplink connection.

Other embodiments of these aspects include corresponding systems, apparatus, and computer programs, configured to perform the actions of the methods, encoded on computer storage devices.

These and other embodiments may each optionally include one or more of the following features. For instance, determining that the packet was not transmitted by the NIC of the secondary information handling system, and in response, determining whether the packet was received from the uplink connection; determining that the packet was received from the uplink connection, and in response, determining whether the packet is an ARP request; and determining that the packet is an ARP request, and in response, creating a gratuitous ARP from the ARP request and transmitting the gratuitous ARP to the secondary information handling system. In response to determining that the packet is an ARP request, forwarding the ARP request to a central processing unit (CPU) of the primary information handling system. Determining that the packet was not received from the uplink connection, and in response, forwarding the packet to the uplink connection. Determining that the packet is not an ARP request, and in response, determining whether the packet is an ARP response; and determining that the packet is not an ARP response, and in response, forwarding the packet to a central processing unit (CPU) of the primary information handling system. Determining that the packet is an ARP request, and in response, clone the packet and transmit to the NIC of the secondary information handling system; and forwarding the ARP response to the CPU of the primary information handling system. Determining that the packet is not an ARP request, and in response, determining whether the secondary information handling system is active and the primary information handling system is an off-power state; and determining that the secondary information handling system is active and the primary information handling system is an off-power state, and in response, forwarding the packet to the uplink connection. Determining that the packet is not an ARP request, and in response, determining whether the secondary information handling system is active and the primary information handling system is an off-power state; and determining that the secondary information handling system is not active and the primary information handling system is active, and in response, dropping the packet. Receiving, at the smartNIC of the primary information handling system, an additional packet; determining that the primary information system is in a power-off state; and in response to determining that the primary information handling system is in the power-off state, forward the additional packet to the NIC of the secondary information handling system. The smartNIC is associated with a first power domain separate from a second power domain of a central processing unit (CPU) of the primary information handling system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
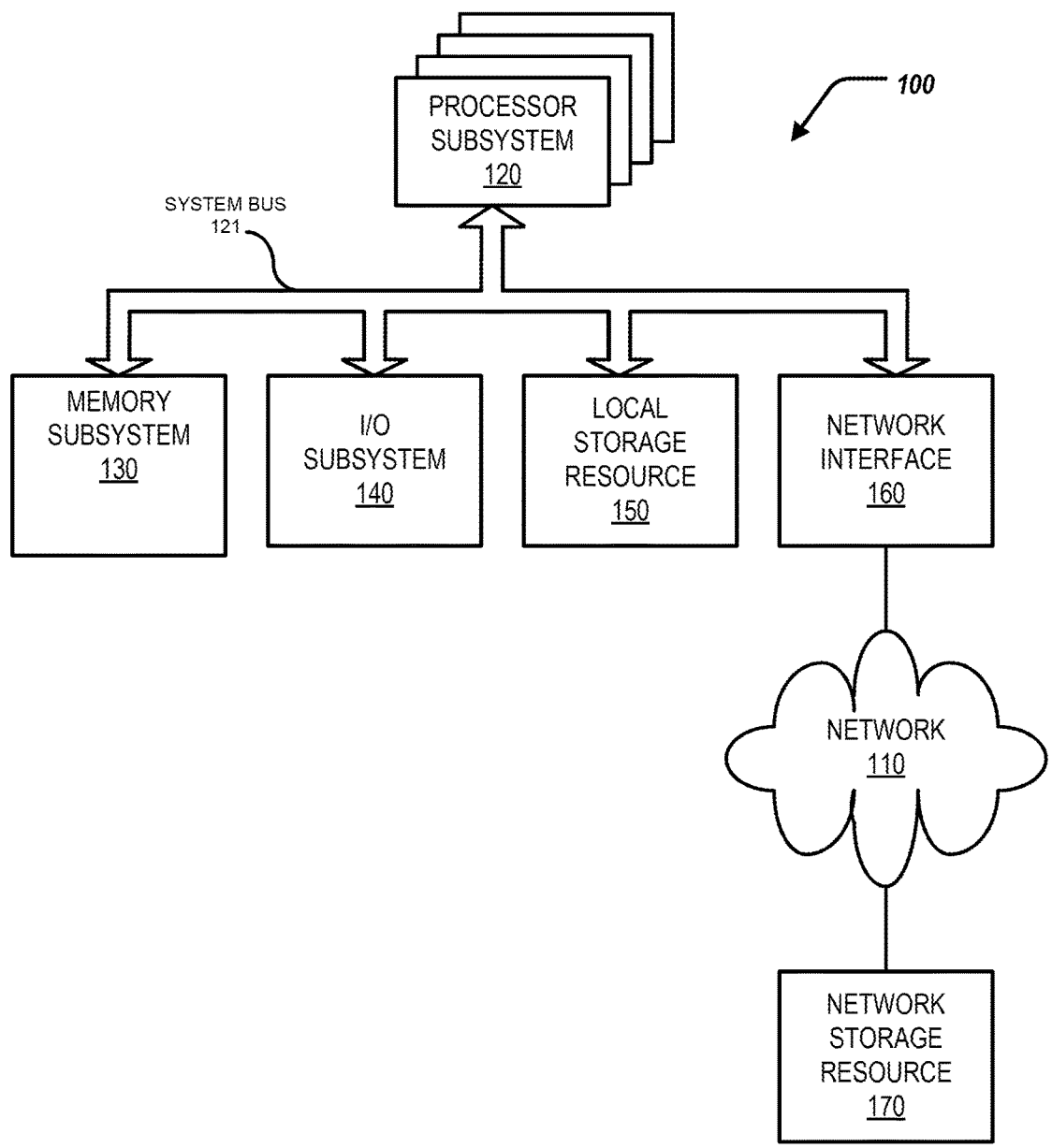
FIG. 1 is a block diagram of selected elements of an embodiment of an information handling system.

This disclosure discusses methods and systems for managing failover between information handling systems. In short, a smartNIC can provide bypass functionality such when a first power domain is powered off (a CPU of a primary information handling system is powered off), a power domain of the smartNIC remains powered-on such that the smartNIC can forward all network traffic from the primary information handling system to a secondary information handling system. Additionally, the smartNIC can include additional functionality to support load balancing and mirroring of broadcast/multicast packets such that the secondary information handling system can assume the role of the primary information handling system in an expedited manner during failover. At a high level, the secondary information handling system is placed in a power-on state first (prior to the primary information handling system) such that the smartNIC can "learn" and clone the MAC of the NIC of the secondary information handling system from a gratuitous ARP that is sent by the secondary information handling system when the secondary information handling system comes online. Further, the primary information handling system can come online, and provide the smartNIC with the same MAC as the NIC. Moreover, when the ARP requests and responses are received from the uplink connection (e.g., the external network), they are mirrored and converted to gratuitous ARPs for the secondary information handling system. Thus, the primary information handling system can respond to the ARP request and update the ARP cache of both the primary information handling system and the secondary information handling system.

Specifically, this disclosure discusses a system and a method for managing failover between information handling systems, including receiving, at an interface of a smart network interface card (smartNIC) of a primary information handling system, a packet, the primary information handling system communicatively couped to a secondary information handling system; determining whether the packet was transmitted by a network interface card (NIC) of the secondary information handling system; determining that the packet was transmitted by the NIC of the secondary information handling system, and in response, determining whether the packet is an address resolution protocol (ARP) request; determining that the packet is an ARP request, and in response, cloning a medium access control (MAC) address of the NIC of the secondary information handling system at the smartNIC of the primary information handling system; and forwarding the ARP request to a uplink connection.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
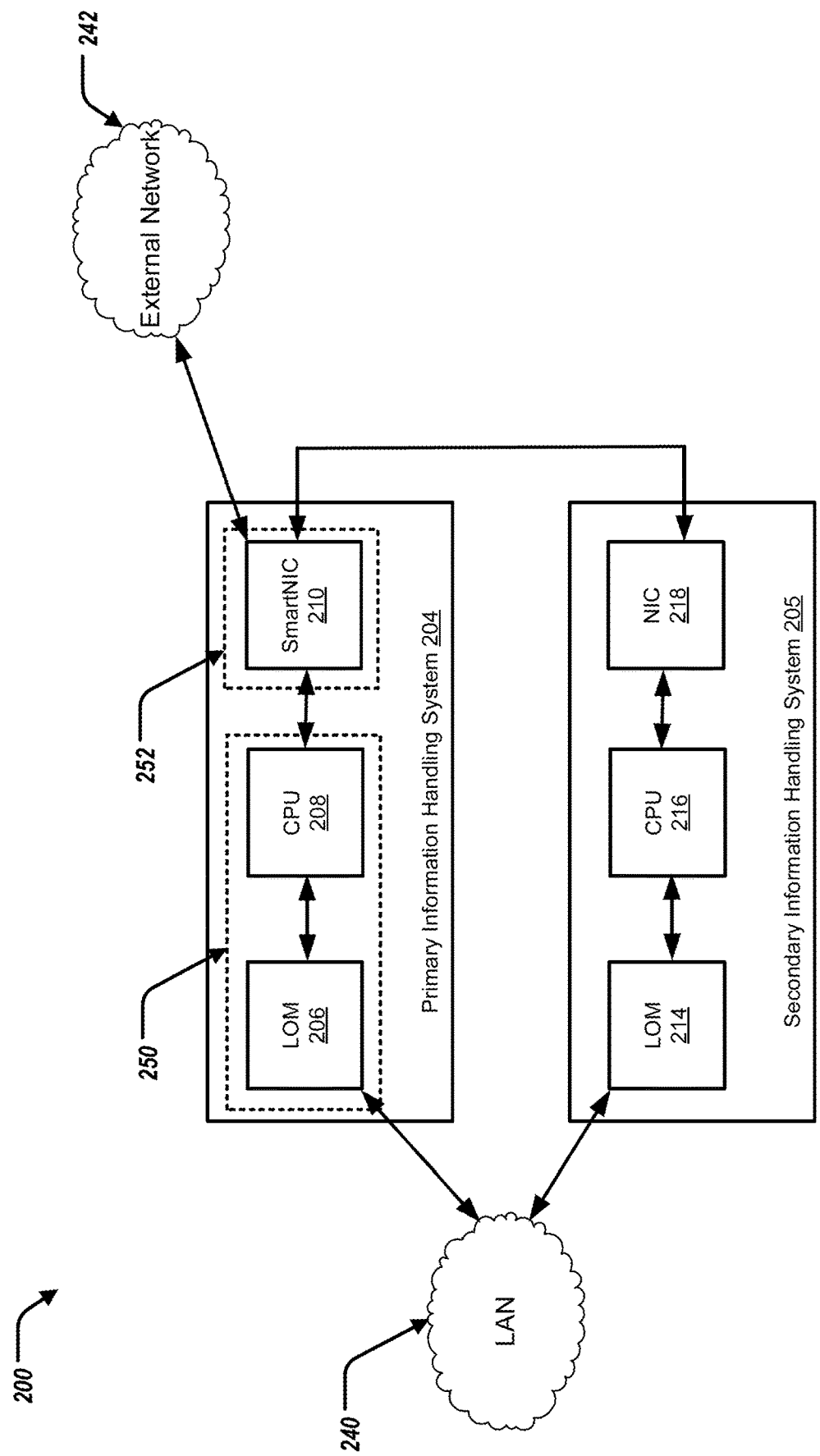
FIG. 2 illustrates a block diagram of a computing environment for managing failover between information handling systems.
Figure 3:
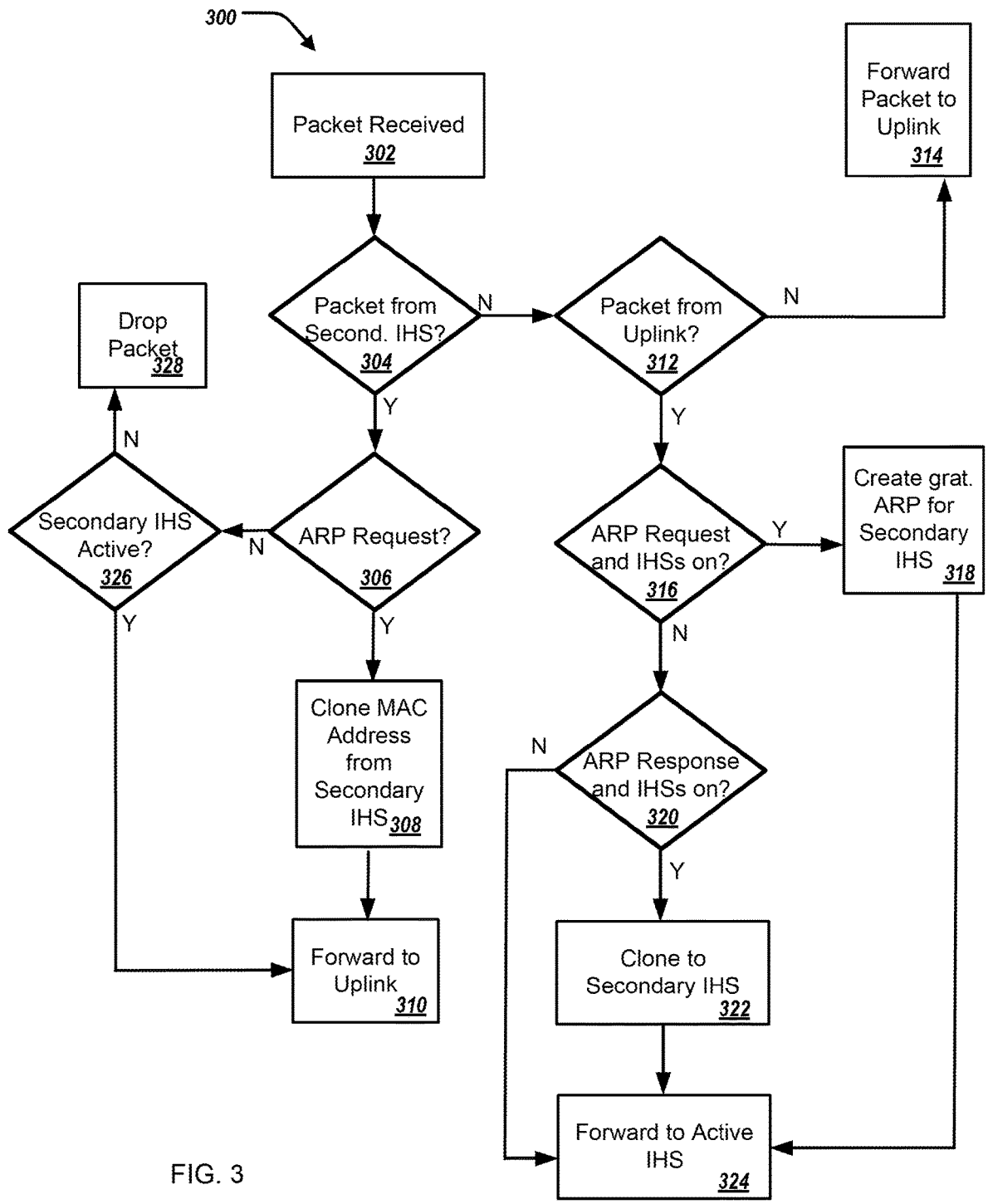
FIG. 3 illustrates a method for managing failover between information handling systems.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning to FIG. 2, FIG. 2 illustrates an environment 200 including a primary information handling system 204, a secondary information handling system 205, a local access network 240 (a protected network) and an external network 242 (an insecure unprotected network) (e.g., the Internet). The primary information handling system 204 can include a local access network (LAN) on motherboard (LOM) 206, a central processing unit (CPU) 208, and a smart network interface card (smartNIC) 210. The LOM 206 and the CPU 208 can be associated with a first power domain 250 and the smartNIC 210 can be associated with a second power domain 252 that is separate from the first power domain 250. The CPU 208 can be in communication with the LOM 206 and the smartNIC 210. The smartNIC 210 can be in communication with the external computing network 242. The LOM 206 can be in communication with the LAN 240. The primary information handling system 204 can be communicatively coupled to the secondary information handling system 205. In some examples, the primary information handling system 204 is similar to, or includes, the information handling system 100 of FIG. 1. The smartNIC 210 can provide direct access to the external network 242 to either the primary information handling system 204 or the secondary information handling system 205. In some examples, the smartNIC 210 can include a CPU and memory that is independent from the CPU 208 and the memory of the primary information handling system 204.

The secondary information handling system 205 can include a LOM 214, a CPU 216, and a network interface card (NIC) 218. The CPU 216 can be in communication with the LOM 214 and the NIC 218. The NIC 218 can be in communication with the smartNIC 210. The LOM 214 can be in communication with the LAN 240. In some examples, the secondary information handling system 205 is similar to, or includes, the information handling system 100 of FIG. 1.

In some examples, the smartNIC 210 can determine a power state of the first power domain 250 via a link (e.g., PCIe link) between the smartNIC 210 and the CPU 208, and/or identification of a "keep-alive" LLDP packet or attribute in a device driver. In some examples, the smartNIC 210 can determine a power state of the secondary information handling system 205 via a network port link between the smartNIC 210 and the NIC 18.

In short, the smartNIC 210 can provide bypass functionality such when the first power domain 250 is powered off (the CPU 208 is powered off), the power domain 252 of the smartNIC 210 remains powered-on such that the smartNIC 210 can forward all network traffic from the primary information handling system 204 to the secondary information handling system 205. Additionally, the smartNIC 210 can include additional functionality to support load balancing and mirroring of broadcast/multicast packets such that the secondary information handling system 205 can assume the role of the primary information handling system 204 in an expedited manner during failover. At a high level, the secondary information handling system 205 is placed in a power-on state first (prior to the primary information handling system 204) such that the smartNIC 210 can "learn" and clone the MAC of the NIC 218 from a gratuitous ARP that is sent by the secondary information handling system 205 when the secondary information handling system 205 comes online. Further, the primary information handling system 204 can come online, and provide the smartNIC 210 with the same MAC as the NIC 218. Moreover, when the ARP requests and responses are received from the uplink connection (e.g., the external network 242), they are mirrored and converted to gratuitous ARPs for the secondary information handling system 205. Thus, the primary information handling system 204 can respond to the ARP request and update the ARP cache of both the primary information handling system 204 and the secondary information handling system 205.

FIG. 3 illustrates a flowchart depicting selected elements of an embodiment of a method 300 for managing failover between information handling systems. The method 300 may be performed by the information handling system 100, the primary information handling system 204, the secondary information handling system 205, and/or the smartNIC 210, and with reference to FIGS. 1-2. It is noted that certain operations described in method 300 may be optional or may be rearranged in different embodiments.

The smartNIC 210 receives a packet, at 302. The packet can include an Ethernet Frame. The smartNIC 210 determines whether the packet was transmitted by the NIC 218, at 304. That is, the smartNIC 210 determines whether the packet was received at a port of the smartNIC 210 that is associated with the NIC 218. In some examples, the smartNIC 210 can determine that the packet was transmitted by the NIC 218, and in response, determine whether the packet is an address resolution protocol (ARP) request, at 306. That is, the smartNIC 210 determines whether the packet is an ARP request from the secondary information handling system 205. In some examples, the smartNIC 210 can determine that the packet is an ARP request (at 306), and in response, clone a medium access control (MAC) address of the NIC 218 at the smartNIC 210, at 308. That is, the MAC address of the NIC 218 is cloned as the MAC address of the smartNIC 210. To ensure that the MAC address of the NIC 218 is cloned as the MAC address of the smartNIC 210, the power state of the secondary information handling system 205 and the power state of the second power domain 252 is changed to an on-power state prior to adjusting the power state of the first power domain 250 to the on-power state. The smartNIC 210 can forward the ARP request to the uplink connection (at 310). For example, the smartNIC 210 can forward the ARP request to the CPU 208, the external network 242, or both.

In some examples, the smartNIC 210 can determine that the packet was not transmitted by the NIC 218 (at 304), and in response, determine whether the packet was received from the uplink connection, at 312. That is, the smartNIC 210 determines whether the packet was received at a port of the smartNIC 210 that is associated with the uplink connection. For example, the smartNIC 210 can determine that the packet was received from the external network 242. In some examples, the smartNIC 210 can determine that the packet was received from the uplink connection (at 312), and in response, determine whether the packet is an ARP request (and the first power domain 250 and the secondary information handling system 205 are both in a power-on state), at 316. That is, the smartNIC 210 determines whether the packet is an ARP request from the uplink connection (e.g., the external network 242). In some examples, the smartNIC 210 can determine that the packet is an ARP request (at 316), and in response, create a gratuitous ARP from the ARP request and transmit the gratuitous ARP to the secondary information handling system 205, at 318. That is, the smartNIC 210 can determine that the packet is an ARP request from the uplink connection (e.g., the external network 242), and in response, creates the gratuitous ARP from the ARP request and transmit the gratuitous ARP to the secondary information handling system 205 (e.g., the NIC 218). In some examples, when the smartNIC 210 determines that the packet is an ARP request from the uplink connection, the smartNIC 210 further sends the original packet to the CPU 208 such that only the CPU 208 responds to the original ARP request, at 324.

In some examples, the smartNIC 210, after creating the gratuitous ARP from the ARP request and transmitting the gratuitous ARP to the secondary information handling system 205 (e.g., the NIC 218), forwards the ARP request (packet) to the CPU 208 of the primary information handling system 204.

In some examples, the smartNIC 210 can determine that the packet was not received from the uplink connection (at 312), and in response, forwards the packet to the uplink connection, at 314. That is, the smartNIC 210 can determine that the packet was not received from the secondary information handling system 205 (at 304), and determines that the packet was not received from the uplink connection (at 312), and forwards the packet to the uplink connection (e.g., the external network 242) (at 314).

In some examples, the smartNIC 210 can determine that the packet is not an ARP request (at 316), and in response, determine whether the packet is an ARP response (and the first power domain 250 and the secondary information handling system 205 are both in a power-on state), at 320. That is, the smartNIC 210 determines whether the packet is an ARP response from the uplink connection (e.g., the external network 242). Furthermore, the smartNIC 210 can determine that the packet is not an ARP response (at 320), and in response, forward the packet to the active information handling system, at 324. For example, the smartNIC 210 can forward the packet to CPU 208 of the primary information handling system 204 when the primary information handling system 204 is the active information handling system. That is, when the smartNIC 210 determines that the packet is from the uplink connection, the packet is not an ARP request, and the packet is not a ARP response, the smartNIC 210 sends the original packet to the CPU 208, at 324. For example, the smartNIC 210 can forward the packet to secondary information handling system 205 when the secondary information handling system 205 is the active information handling system.

In some examples, the smartNIC 210 can determine that the packet is an ARP response (at 320), and in response, clones the packet and transmit the cloned packet to the NIC 218 of the secondary information handling system 205, at 322. That is, when the smartNIC 210 determines that packet is from the uplink connection and the packet is an ARP response, the smartNIC 210 clones the packet and transmits the packet to the NIC 218 of the secondary information handling system 205. Additionally, the smartNIC 210 forwards the original packet to the CPU 208 of the primary information handling system 204, at 324.

In some examples, the smartNIC 210 can determine that the packet is not an ARP request (at 306), and in response, determine whether the secondary information handling system 205 is active (in a power-on state) and that the primary information handling system 204 is inactive (in an off-power state), at 326. That is, the smartNIC 210 can determine that the packet is from the secondary information handling system 205 and is not an ARP request, and in response, determine whether the secondary information handling system 205 is active (in a power-on state) and that the primary information handling system 204 is inactive (the power domain 250 in an off-power state). In some examples, the smartNIC 210 can determine that the secondary information handling system 205 is active (in a power-on state) and that the primary information handling system 204 is inactive (the power domain 250 is in an off-power state) (at 326), and in response, the smartNIC 210 can forward the ARP request to the uplink connection (at 310). For example, the smartNIC 210 can forward the ARP request to the CPU 208, the external network 242, or both. In some examples, the smartNIC 210 can determine that the secondary information handling system 205 is not active (in a powered-off state) and that the primary information handling system 204 is active (the power domain 250 is in an on-power state) (at 326), and drops the packet, at 328.

In some examples, the smartNIC 210 can receive an additional packet at a later time. The smartNIC 210 can determine that the primary information handling system 204 is in an power-off state (the power domain 250 is inactive or in an power-off state). The smartNIC 210, in response to determining that the primary information handling system 204 is in the power-off state (the power domain 250 is inactive or in an power-off state), can forward the additional packet to the NIC 218 of the secondary information handling system 205.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing failover between information handling systems, the method comprising:
    receiving, at an interface of a smart network interface card (smartNIC) of a primary information handling system, a packet, the primary information handling system communicatively coupled to a secondary information handling system, the smartNIC associated with a first power domain separate than a second power domain of a central processing unit (CPU) of the primary information handling system;
    determining whether the packet was transmitted by a network interface card (NIC) of the secondary information handling system;
    determining that the packet was transmitted by the NIC of the secondary information handling system, and in response, determining whether the packet is an address resolution protocol (ARP) request;
    determining that the packet is an ARP request, and in response, cloning a medium access control (MAC) address of the NIC of the secondary information handling system at the smartNIC of the primary information handling system, including:
    adjusting a power state of the secondary information handling system and a first power state of the first power domain of the smartNIC to an on-power state to clone the MAC address of the NIC of the secondary information handling system prior to adjusting a power state of the second power domain of the primary information handling system to an on-power state; and
    forwarding the ARP request to a uplink connection.

2. The computer-implemented method of claim 1, further comprising:
    determining that the packet was not transmitted by the NIC of the secondary information handling system, and in response, determining whether the packet was received from the uplink connection;
    determining that the packet was received from the uplink connection, and in response, determining whether the packet is an ARP request; and
    determining that the packet is an ARP request, and in response, creating a gratuitous ARP from the ARP request and transmitting the gratuitous ARP to the secondary information handling system.

3. The computer-implemented method of claim 2, further comprising:
    in response to determining that the packet is an ARP request, forwarding the ARP request to a central processing unit (CPU) of the primary information handling system.

4. The computer-implemented method of claim 2, further comprising:
   determining that the packet was not received from the uplink connection, and in response, forwarding the packet to the uplink connection.

5. The computer-implemented method of claim 2, further comprising:
   determining that the packet is not an ARP request, and in response, determining whether the packet is an ARP response; and
   determining that the packet is not an ARP response, and in response, forwarding the packet to a central processing unit (CPU) of the primary information handling system.

6. The computer-implemented method of claim 5, further comprising:
   determining that the packet is an ARP request, and in response, clone the packet and transmit to the NIC of the secondary information handling system; and
   forwarding the ARP response to the CPU of the primary information handling system.

7. The computer-implemented method of claim 1, further comprising:
   determining that the packet is not an ARP request, and in response, determining whether the secondary information handling system is active and the primary information handling system is an off-power state; and
   determining that the secondary information handling system is active and the primary information handling system is an off-power state, and in response, forwarding the packet to the uplink connection.

8. The computer-implemented method of claim 1, further comprising:
   receiving, at the smartNIC of the primary information handling system, an additional packet;
   determining that the primary information system is in a power-off state; and
   in response to determining that the primary information handling system is in the power-off state, forward the additional packet to the NIC of the secondary information handling system.

9. An information handling system comprising a processor having access to memory media storing instructions executable by the processor to perform operations, comprising:
   receiving, at an interface of a smart network interface card (smartNIC) of a primary information handling system, a packet, the primary information handling system communicatively coupled to a secondary information handling system, the smartNIC associated with a first power domain separate than a second power domain of a central processing unit (CPU) of the primary information handling system;
   determining whether the packet was transmitted by a network interface card (NIC) of the secondary information handling system;
   determining that the packet was transmitted by the NIC of the secondary information handling system, and in response, determining whether the packet is an address resolution protocol (ARP) request;
   determining that the packet is an ARP request, and in response, cloning a medium access control (MAC) address of the NIC of the secondary information handling system at the smartNIC of the primary information handling system, including:
   adjusting a power state of the secondary information handling system and a first power state of the first power domain of the smartNIC to an on-power state to clone the MAC address of the NIC of the secondary information handling system prior to adjusting a power state of the second power domain of the primary information handling system to an on-power state; and
   forwarding the ARP request to a uplink connection.

10. The information handling system of claim 9, the operations further comprising:
    determining that the packet was not transmitted by the NIC of the secondary information handling system, and in response, determining whether the packet was received from the uplink connection;
    determining that the packet was received from the uplink connection, and in response, determining whether the packet is an ARP request;
    determining that the packet is an ARP request, and in response, creating a gratuitous ARP from the ARP request and transmitting the gratuitous ARP to the secondary information handling system.

11. The information handling system of claim 10, the operations further comprising:
    in response to determining that the packet is an ARP request, forwarding the ARP request to a central processing unit (CPU) of the primary information handling system.

12. The information handling system of claim 10, the operations further comprising:
    determining that the packet was not received from the uplink connection, and in response, forwarding the packet to the uplink connection.

13. The information handling system of claim 10, the operations further comprising:
    determining that the packet is not an ARP request, and in response, determining whether the packet is an ARP response; and
    determining that the packet is not an ARP response, and in response, forwarding the packet to a central processing unit (CPU) of the primary information handling system.

14. The information handling system of claim 13, the operations further comprising:
    determining that the packet is an ARP request, and in response, clone the packet and transmit to the NIC of the secondary information handling system; and
    forwarding the ARP response to the CPU of the primary information handling system.

15. The information handling system of claim 9, the operations further comprising:
    determining that the packet is not an ARP request, and in response, determining whether the secondary information handling system is active and the primary information handling system is an off-power state; and
    determining that the secondary information handling system is active and the primary information handling system is an off-power state, and in response, forwarding the packet to the uplink connection.

16. The information handling system of claim 9, the operations further comprising:
    receiving, at the smartNIC of the primary information handling system, an additional packet;
    determining that the primary information system is in a power-off state; and
    in response to determining that the primary information handling system is in the power-off state, forward the additional packet to the NIC of the secondary information handling system.

17. A non-transitory computer-readable medium storing software comprising instructions executable by one or more computers which, upon such execution, cause the one or more computers to perform operations comprising:
- receiving, at an interface of a smart network interface card (smartNIC) of a primary information handling system, a packet, the primary information handling system communicatively couped to a secondary information handling system, the smartNIC associated with a first power domain separate than a second power domain of a central processing unit (CPU) of the primary information handling system;
- determining whether the packet was transmitted by a network interface card (NIC) of the secondary information handling system;
- determining that the packet was transmitted by the NIC of the secondary information handling system, and in response, determining whether the packet is an address resolution protocol (ARP) request;
- determining that the packet is an ARP request, and in response, cloning a medium access control (MAC) address of the NIC of the secondary information handling system at the smartNIC of the primary information handling system, including:
- adjusting a power state of the secondary information handling system and a first power state of the first power domain of the smartNIC to an on-power state to clone the MAC address of the NIC of the secondary information handling system prior to adjusting a power state of the second power domain of the primary information handling system to an on-power state; and
- forwarding the ARP request to a uplink connection.

* * * * *